(12) United States Patent
Walker et al.

(10) Patent No.: US 9,883,348 B1
(45) Date of Patent: Jan. 30, 2018

(54) INDOOR NAVIGATION AND ORIENTATION DETERMINATION SYSTEM

(71) Applicant: Rockwell Collins, Inc., Cedar Rapids, IA (US)

(72) Inventors: Brad A. Walker, Mount Vernon, IA (US); Steven E. Koenck, Cedar Rapids, IA (US); Gary A. McGraw, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/415,671

(22) Filed: Jan. 25, 2017

(51) Int. Cl.
*H04W 24/00* (2009.01)
*H04W 4/02* (2009.01)
*G01S 5/02* (2010.01)
*G01C 21/20* (2006.01)
*G01C 21/16* (2006.01)
*G06F 3/0346* (2013.01)
*G06F 3/01* (2006.01)

(52) U.S. Cl.
CPC .......... *H04W 4/028* (2013.01); *G01C 21/165* (2013.01); *G01C 21/206* (2013.01); *G01S 5/0284* (2013.01); *G06F 3/012* (2013.01); *G06F 3/0346* (2013.01); *H04W 4/026* (2013.01); *H04W 4/027* (2013.01)

(58) Field of Classification Search
CPC ..... H04W 4/023; H04W 4/025; H04W 4/026; H04W 4/027; H04W 4/028; G01C 21/165; G01C 21/206; G01S 5/0284; G06F 3/012; G06F 3/0346
USPC ....................................................... 455/456.1
See application file for complete search history.

(56) References Cited

U.S. PATENT DOCUMENTS

| | | | |
|---|---|---|---|
| 2014/0148196 A1* | 5/2014 | Bassan-Eskenazi | G01S 11/02 455/456.1 |
| 2015/0133173 A1* | 5/2015 | Edge | G01S 1/66 455/456.6 |
| 2016/0358459 A1* | 12/2016 | Singhar | G08C 17/02 |

* cited by examiner

*Primary Examiner* — Huy C Ho
(74) *Attorney, Agent, or Firm* — Angel N. Gerdzhikov; Donna P. Suchy; Daniel M. Barbieri (57) ABSTRACT

A system and related method for navigation and orientation determination in an indoor or GPS-denied environment mounts a static reference transceiver (SRT) at a known, fixed position within the environment, the fixed position referenced by a coordinate reference frame (CRF) of the SRT. The SRT communicates its position to mobile dismounted units within the environment, determining a range and orientation angle of each mobile unit relative to the SRT CRF based on response signals received from the mobile units. The SRT provides the determined SRT-CRF-referenced ranges and orientation angles to the mobile units, which may share orientation data with each other or relay the SRT-referenced location data to other mobile units not within line of sight of the SRT.

18 Claims, 5 Drawing Sheets

INDOOR NAVIGATION AND ORIENTATION DETERMINATION SYSTEM

CROSS-REFERENCE TO RELATED APPLICATIONS

This application relates to the following applications concurrently filed herewith and each incorporated herein by these references in their entirety: HEAD TRACKER FOR DISMOUNTED USERS by Steven E. Koenck and Brad A. Walker, U.S. patent application Ser. No. 15/415,646.

BACKGROUND

Location and head-tracking within an indoor environment for multiple mobile dismounted users, e.g., soldiers on different levels of a multi-story facility, each having a head-mounted display (HMD), may be achieved by several methods, each of which has particular weaknesses and limitations. For example, an augmented reality (AR) system such as the Oculus Rift uses inertial and optical sensors to track head pose data (e.g., the position of the wearer's head as well as its orientation to a given frame of reference), but requires an external optical reference to establish the reference frame. Further, the Oculus system is physically connected to a computer for processing; the system is therefore constrained to a single room and thus insufficiently mobile for a complex multi-level environment.

By way of another example, the Microsoft Hololens system uses a depth sensor (e.g., time-of-flight) to map its surroundings, and then uses point-cloud processing in combination with inertial sensors to maintain and track head pose during dynamic head movement. However, the Hololens system requires room calibration and measurement prior to use and is also range-limited due to its dependence on measuring the return time of reflected infrared (IR) pulses. In addition, many surfaces frustrate or resist mapping via depth sensors due to their material properties, e.g., surface reflectivity.

Optical features may be tracked using cameras or image sensors in conjunction with inertial sensors and image processing. Similarly, physical features may be tracked using depth sensors, inertial sensors, and point cloud processing. In both cases, however, such systems may be sensitive to obscuration of the objects or markers that must be detected to establish the reference frame. In addition, using scene geometry alone complicates the maintenance of precise position and orientation; a map of optical objects and references must be well-known so that position and orientation may be ascertained from the reference points. The necessary processing load presents significant size, weight, power, and cost (SWaP-C) challenges for mobile implementation. The use of scene geometry to maintain precise position and orientation is difficult without pre-calibration; if reference objects or markers are placed in an uncalibrated environment, there are significant requirements for infrastructure setup and configuration. In addition, depth scanning devices have problems with surface composition, which can cause dispersion of the structured light or IR light pulses.

SUMMARY

In one aspect, embodiments of the inventive concepts disclosed herein are directed to a system and related method for providing navigation and orientation determination for multiple mobile dismounted users within an environment. The system may enable multi-user coordination of augmented reality (AR), building mapping, simulation and training, and combat situational awareness in complex multi-level indoor environments. The system may include a base unit mountable in a fixed position within an indoor environment and referenced to one or more coordinate reference frames (CRF). The base unit may include an antenna array and a static reference transceiver (SRT) configured to transmit the position of the base unit to mobile units within range and receive a response signal from any mobile units receiving the position signal. The base unit may include a processor for determining angle of arrival (AoA) in azimuth and/or elevation for each arriving response signal, thereby determining the location of each responding mobile unit relative to the base unit CRF. The base unit may transmit, via the antenna array, orientation signals to each responding mobile unit, each orientation signal including the location of the receiving mobile unit relative to the base unit CRF. The mobile units may each include a local antenna array and local transceiver for receiving the orientation signals from the base unit and transmitting the response signals. The mobile units may include an inertial measurement unit (IMU) for determining a head pose (position/rotational orientation) of the mobile unit's user relative to the local CRF of the mobile unit. The mobile units may include a local processor for determining a local AoA of the arriving orientation signal and determining a heading of the mobile unit relative to the base unit CRF, based on the local AoA and the received orientation signal.

In a further aspect, embodiments of the inventive concepts disclosed herein are directed to a method for navigation and orientation determination via one or more base units within an environment. The method may include mounting the base unit, via an antenna array of a mobile unit, one or more signals including location data of a base unit, or SRT), to a fixed position within the environment, the fixed position referenced to a base unit CRF. The method may include transmitting, via an antenna array of the base unit, an initial signal that may include location data of the fixed position. The method may include receiving, via the antenna array, response signals to the initial signal from mobile units within line of sight (LOS). The method may include determining, via a processor of the base unit, location data of each mobile unit relative to the base unit CRF, such as a range and orientation angle of each mobile unit relative to the base unit, based on the initial and response signals. The method may include transmitting to each mobile unit the determined base-unit-CRF-referenced mobile unit location data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for indoor navigation and orientation determination among mobile dismounted users moving through a complex environment where differential global navigation satellite systems (GNSS) or other conventional approaches to user location and head-tracking may not operate at optimal accuracy, such as indoor or multi-level facilities. Embodiments of the inventive concepts disclosed herein may enable new applications that require precise position and orientation tracking, such as augmented reality, building and structure mapping, combat situational awareness, simulation and training, and multi-user coordination among a network of mobile users.

Figure 1:
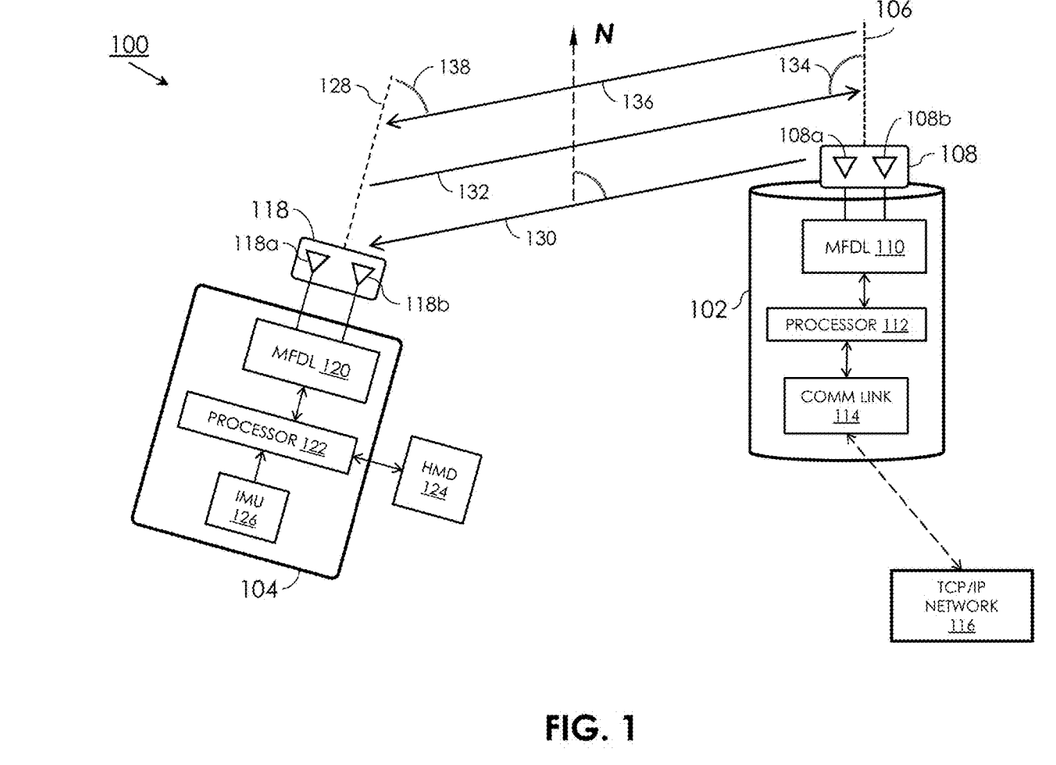
FIG. 1 illustrates an exemplary embodiment of a system for navigation and orientation determination within an environment according to the inventive concepts disclosed herein.

Referring to FIG. 1, an exemplary embodiment of a system 100 for navigation and orientation determination within an environment according to the inventive concepts disclosed herein may include a base unit 102 and one or more mobile units 104 within a line-of-sight of the base unit 102. The base unit 102 may be mounted in a fixed position to a wall or other surface within a defined environment. The environment may be a structure or facility incorporating multiple levels, whether fully or partially enclosed or fully or partially indoors. Many urban environments (or simulations thereof) may include partially enclosed spaces within which satellite-based platform-referenced navigation systems may not operate with optimal precision or may be unavailable. The base unit 102 (also referred to as a static reference transceiver (SRT)) may be referenced to one or more platform-referenced coordinate reference frames (CRF) 106. For example, the base unit 102 may be mounted in a surveyed location at an accurate position and orientation and thereby be referenced to a geocoordinated CRF (e.g., geodetic north N). Multiple base units 102 may be mounted at known locations within the environment, such that a CRF common to the base units may be registered to a building or structure model (e.g., construction blueprints for the building or structure in which the environment is embodied) and the common CRF may be a reference frame specific to the building or structure.

The fixed position of a base unit 102 may include coordinates corresponding to the location of the base unit 102, as well as an orientation of the base unit 102. For example, the base unit 102 may be mounted at a geocoordinated location expressible by a latitude, a longitude, and an elevation (e.g., above mean sea level (MSL)). The fixed position of the base unit 102 may include coordinates corresponding to the rotational orientation of the base unit, or the pitch, yaw, and roll angles of the base unit relative to a defined origin and reflecting whether the base unit 102 is mounted to, e.g., a floor surface, ceiling surface, or wall surface within the environment.

Each base unit 102 may include an antenna array 108 comprising two or more antenna elements 108a-b. The antenna array 108 may be an electronically scanned antenna array (ESA), and the antenna elements 108a-b may be left and right elements of a monoplane antenna configured to measure the angle of arrival (AoA) of incoming radio frequency (RF) signals in a single plane, e.g., horizontally (x- or y-axis) along a single floor or level. Alternatively, the antenna array 108 may be a dual-plane array in which the antenna elements 108a-b are respectively configured for horizontal and vertical planes (e.g., for use in a multilevel environment wherein the base unit 102 and mobile units 104 are separated by z-axis distances) such that the antenna element 108a may measure the AoA of an arriving signal with respect to the horizontal plane and the antenna element 108b may measure the AoA of the arriving signal (the originating mobile unit 104 of which may be located on a higher or lower level relative to the base unit 102) with respect to the z-axis or vertical plane.

The antenna array 108 may be configured for reception from, and transmission to, multiple mobile units 104 simultaneously (e.g., via multiple antenna elements 108a-b or via time division multiple access (TDMA)). The base unit 102 may include a multi-function data link (MFDL) transceiver 110 for receiving and transmitting signals to mobile units 104 via the antenna array 108, and a local processor 112 for generating and decoding signals. The capability of the mobile unit 104 to receive or transmit signals to other mobile units, whether simultaneously or sequentially, and the scheduling of said receptions and transmissions, may be dependent on the processing power available through the local processor 112. The base unit 102 may optionally include a communications link 114 wirelessly, or physically, linked to a TCP/IP network 116 or other network external to the environment; the base unit 102 may utilize the communications link 114 for updating the TCP/IP network 116 as to the positions and orientations of dismounted mobile units within the environment.

Each mobile unit 104 may likewise include an antenna array 118 incorporating antenna elements 118a-b, which may be an ESA array and may include monoplane or dual-plane antenna elements 118a-b as described above. The mobile units 104 may similarly include an MFDL transceiver 120 and local processor 122. The local processor 122 may be connected to a helmet-mounted display 124 (HMD) or other like head-mounted device worn by the user of the mobile unit 104. For example, in a training scenario each HMD 124 may be configured to display augmented reality (AR) objects from an AR database stored commonly or to an onboard memory (not shown) of the HMD 124. Users may be able to "see" their surroundings via the HMD 124, in addition to AR objects superimposed on the field of view (FoV) of the HMD 124 depending on the position and orientation of the user relative to the environment: AR "assets" or "enemies" may appear via the HMD 124 based on the user's proximity to a known or defined "door" or "window" within the environment. Each mobile unit 104 may include an inertial measurement unit (IMU) 126 for determining pose data (position and orientation) of the user relative to a CRF local to the mobile unit (128). For example, the local CRF 128 may be referenced to an origin point, and the IMU 126 may track any movement by the mobile unit 104 (and the user wearing the mobile unit 104) relative to the origin point. The origin point may include a default rotational orientation, e.g., facing due east, and any movement of the user's head (including the mobile unit 104 and HMD 124) may be tracked relative to the default orientation, e.g., as rotation around the z-axis or yaw axis of the user.

A base unit 102 mounted within an environment may provide position and head-tracking for mobile units 104 within the environment by transmitting an initial position signal (130) including known position information of the base unit to any mobile units 104 within LOS of the base unit 102. A mobile unit 104 may receive the position signal 130 and respond by transmitting a response signal 132 back to the base unit 102 via the antenna array 118. Based on the transmission and arrival times of the position signal 130 and response signal 132, the local processor 112 of the base unit may determine (e.g., via two-way timing and ranging (TWTR) protocol) a range to each responding mobile unit 104, or a distance between the base unit 102 and the mobile unit 104. The local processor 112 may determine the angle of arrival (AoA) 134 of the received response signal 132, e.g., by measuring time differences in the arrival of the response signal 132 at individual antenna elements 108a-b. The local processor 112 may use the determined AoA 134 to establish a position of the mobile unit 104 relative to the base unit 102, e.g., the relative position of the mobile unit 104 relative to the base unit 102 in a horizontal plane, and whether the mobile unit 104 is located "above" or "below" the base unit 102 within the environment (if the antenna array 108 is configured for dual-plane operation). For example, the orientation of the mobile unit 104 relative to the base unit 102 (and to the base unit CRF 106) at a range, or distance, of $\sqrt{x^2+y^2+z^2}$ may be expressible as a Cartesian coordinate set $\{x, y, z\}$ wherein the position of the mobile unit 104 relative to the base unit 102 (e.g., $\{0, 0, 0\}$ in the base unit CRF 106) may be expressed as an x-distance (e.g., latitude), a y-distance (e.g., longitude), and a z-distance (e.g., elevation), the z-distance being positive or negative depending on whether the mobile unit 104 is "above" or "below" the base unit 102. Similarly, the same orientation may be expressed in spherical or vector terms, e.g., as a spherical coordinate set $\{\rho, \theta, \varphi\}$ for range $\rho$ ($\rho=\sqrt{x^2+y^2+z^2}$), polar angle $\theta$ (e.g., in the x-plane, or horizontal plane) and azimuthal angle $\varphi$ (e.g., in the z-plane, or vertical plane).

The base unit 102 may transmit the determined position of each mobile unit 104 (relative to the base unit 102 and to the base unit CRF 106) to the mobile unit via an orientation signal 136, which may include the determined AoA 134 of the response signal 132. Alternatively, the orientation signal 136 may include the position information of the base unit, in which case the position signal 130 may be a "ping" signal intended to establish contact with any mobile units 104 within LOS. The MFDL transceiver 120 of the mobile unit 104 may receive (via the antenna array 118) the orientation signal 136; based on the arrival of the orientation signal 136 at individual antenna elements 118a-b, the local processor 122 may determine an AoA (138) of the orientation signal 136. By comparing the received orientation data to the determined AoA 138 of the orientation signal 136, an azimuth value may be determined for updating the local IMU 126 of the mobile unit 104, which determines a heading of the mobile unit 104 (or, alternatively, head pose data of the mobile unit 104 and its user) relative to the base unit CRF. The mobile unit 104 may relay the base-unit-CRF-referenced determined heading back to the base unit 102 via an update signal (not shown) transmitted via the MFDL transceiver 120 and antenna array 118. Similarly, the mobile unit 104 may relay the received base-unit-CRF-referenced orientation and range data, to other mobile units 104 within the environment to enhance multi-unit situational awareness. Some receiving mobile units 104 may be remote mobile units not within direct LOS of the base unit 102; orientation information received from the transmitting, or intermediate, mobile units 104 (e.g., those mobile units 104 in direct LOS with both the base unit 102 and with receiving remote mobile units) may, along with the base unit position information, enable the remote mobile units to determine orientation and heading data relative to the base unit CRF 106 without being in direct LOS to the base unit 102.

Figure 2:
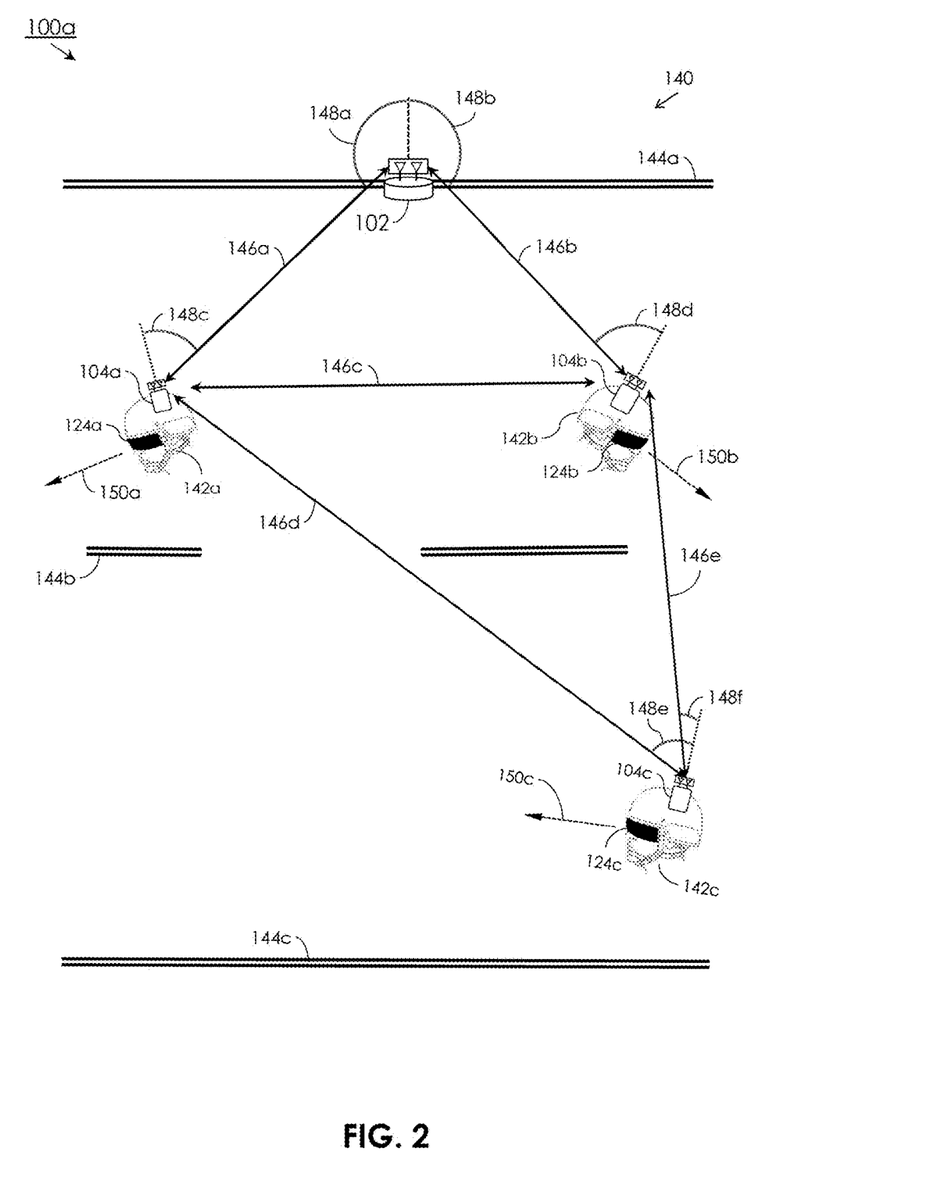
FIG. 2 illustrates operations of the system of FIG. 1 within a multi-level indoor environment.

Referring to FIG. 2, the system 100a may be implemented and may function similarly to the system 100 of FIG. 1, except that the system 100a may be embodied within a multi-level indoor environment 140. The system 100a may include a base unit 102 and mobile units 104a-c; mobile units 104a-b may be intermediate mobile units in direct LOS with the base unit 102, while mobile unit 104c may be a remote mobile unit out of LOS with the base unit 102, but in LOS with the intermediate mobile units 104a-b. The mobile units 104a-c may be worn respectively by users 142a-c, each mobile unit 104a-c connected to an HMD 124a-c worn by the user 142a-c. The base unit 102 may be mounted, for example, on a ceiling (144a) of an upper level 144b of the environment 140, and may establish position and head-tracking relative to the base unit CRF 106 via signal exchange (146a-b) with the intermediate mobile units 104a-b. The signal exchanges 146a-b may include the position signals (130), response signals (132), and/or orientation signals (136) shown by FIG. 1 and described above, and the position information included thereby, e.g., the base unit CRF-referenced position data of the base unit 102 and the determined orientations and ranges of the intermediate mobile units 104a-b relative to the base unit 102 and the base unit CRF 106.

For example, the intermediate mobile units 104a-b may receive base-unit-CRF-referenced position information from the base unit 102 via received signals (146a-b) and respond to the base unit 102, which may determine the orientation and range of each intermediate mobile unit 104a-b by measuring the angles of arrival (148a-b) of the arriving response signals (146a-b). Each intermediate mobile unit 104a-b may receive its orientation and range data from the base unit 102 (e.g., the orientation angle and range of each intermediate mobile unit relative to the base unit) and determine a heading (150a-b) relative to the base unit CRF 106 by comparing the received orientation angles with the angles of arrival (148c-d) of signals received from the base unit 102. The intermediate mobile units 104a-b may exchange orientation data with each other (146c) by transmitting received orientation data (146d-e) to any other mobile units (104a-c) within LOS, along with the base unit CRF-referenced position information of the base unit 102. For example, the remote mobile unit 104c on the lower level 144c, which does not have a direct LOS to the base unit 102 but does have a direct LOS to the intermediate mobile units 104a-b, may receive the orientation data of both intermediate mobile units and the base unit CRF-referenced position information of the base unit 102 via signals (146d-e) transmitted by the intermediate mobile units 104a-b. The remote mobile unit 104c may measure the angles of arrival (148e-f) of the transmitted signals 146d-e; based on the determined angles of arrival and the orientation information received from the intermediate mobile units 104a-b, the remote mobile unit 104c may determine its orientation and range relative to the base unit CRF 106 despite being out of LOS with the base unit 102. The remote mobile unit 104c may also determine a heading (150c) or head pose data relative to the base unit CRF 106. The remote mobile unit 106c may relay the determined orientation and range to the intermediate mobile units 104a-b via signal exchange (146d, e); the intermediate mobile units 104a-b may pass the orientation and range of the remote mobile unit 104c back to the base unit 102, or to other mobile units within LOS, in this way propagating the position data of each mobile unit 104a-c within the environment 140 to all of its counterpart mobile units, whether or not all of the mobile units 104a-c are within LOS of each other.

Figure 3A:
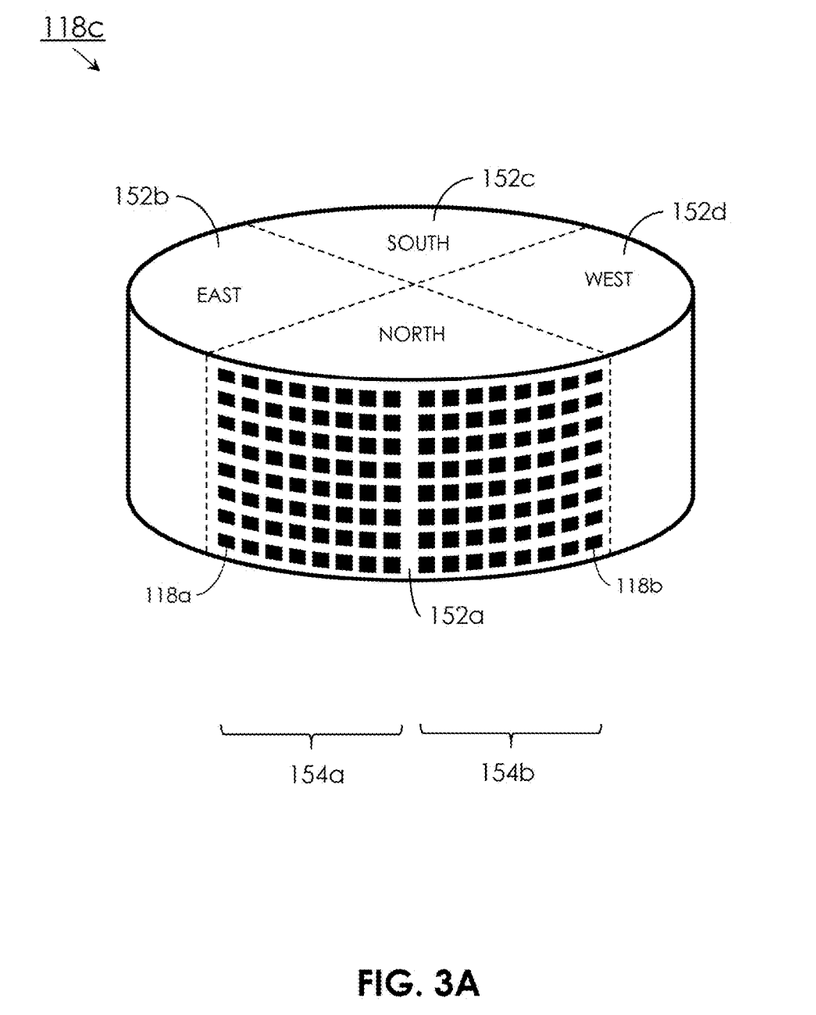
FIG. 3A illustrates an embodiment of an antenna array of the system of FIG. 1.

Referring to FIG. 3A, the mobile unit antenna array 118c may be implemented and may function similarly to the antenna array 118 of FIG. 1, except that the antenna array 118c may be a conformal ESA having a nonplanar shape. For example, the antenna array 118c may be embodied in a cylindrical helmet-mountable housing 152 approximately 2 inches in diameter and 0.5-1 inch in height. The antenna array 118c may include, four sectors 152a-d, each sector encompassing a 90-degree span, e.g., a north sector 152a, an east sector 152b, a south sector 152c, and a west sector 152d. The antenna array 118c may therefore cover a full 360 degrees in the horizontal plane (e.g., relative to the z-axis, or yaw axis), as opposed to flat planar antenna arrays which may require antenna components for each direction; in some embodiments, the antenna array 118c may additionally be steerable through a range of +/−45 degrees relative to the pitch axis, providing a degree of multi-level functionality. Each sector 152a-d may in turn comprise a left half and a right half, e.g., north-left half 154a and north-right half 154b, each half incorporating an 8×8 array of antenna elements 118a-b having a defined phase center and spacing (e.g., each left antenna element 118a and right antenna element 118b of the half 154a-b may be spaced 5 mm apart). The left and right halves 154a-b of each sector 152a-d may allow the mobile unit 104 (FIG. 1) to determine AoA of arriving signals based on the time difference between reception of an incoming signal by the left and right halves 154a-b. In some embodiments, the helmet-mounted housing 152 need not be cylindrical in shape; for example, the components of the antenna array 118c may be embodied in other surface topologies for which the phase delay characteristics are known or determinable, e.g., a spherical or conical surface such as an aircraft nose, or a freeform surface such as a rifle stock or the exterior surface of a combat helmet.

Figure 3B:
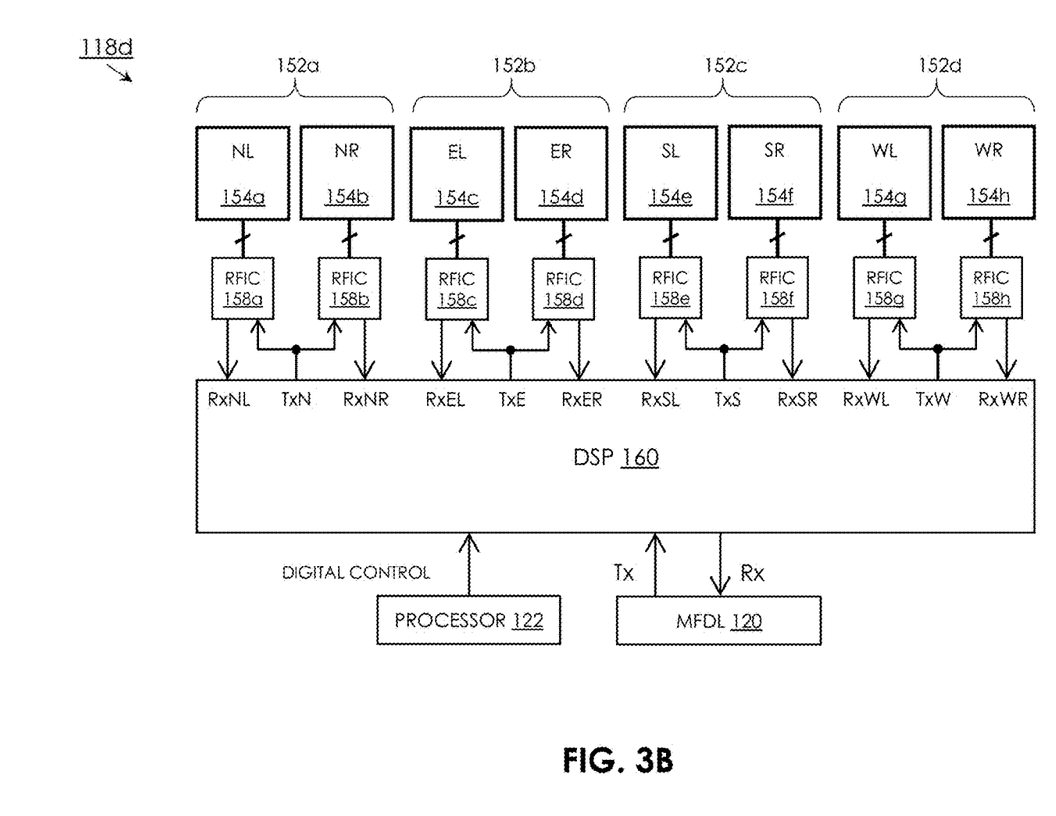
FIG. 3B is a diagrammatic illustration of the components of the antenna array of FIG. 3A.

Referring to FIG. 3B, the antenna array 118d may be implemented and may function similarly to the antenna array 118c of FIG. 3A, except that the antenna array 118d may include RF integrated circuit (RFIC) interfaces 158a-h for each left and right half (154a-h) of each sector (152a-d) of the antenna array 118d. The antenna array 118d may include digital signal processors (DSP) 160 coupled to the MFDL 120 and processors 122 of the mobile unit 104 (FIG. 1), the DSP 160 configured for analog/digital conversion and demodulation enabling communication between the digital mobile unit processors 122 and MFDL transceiver 120 and analog RF carrier frequency used by the antenna array 118d (e.g., 60 GHz).

Figure 4:
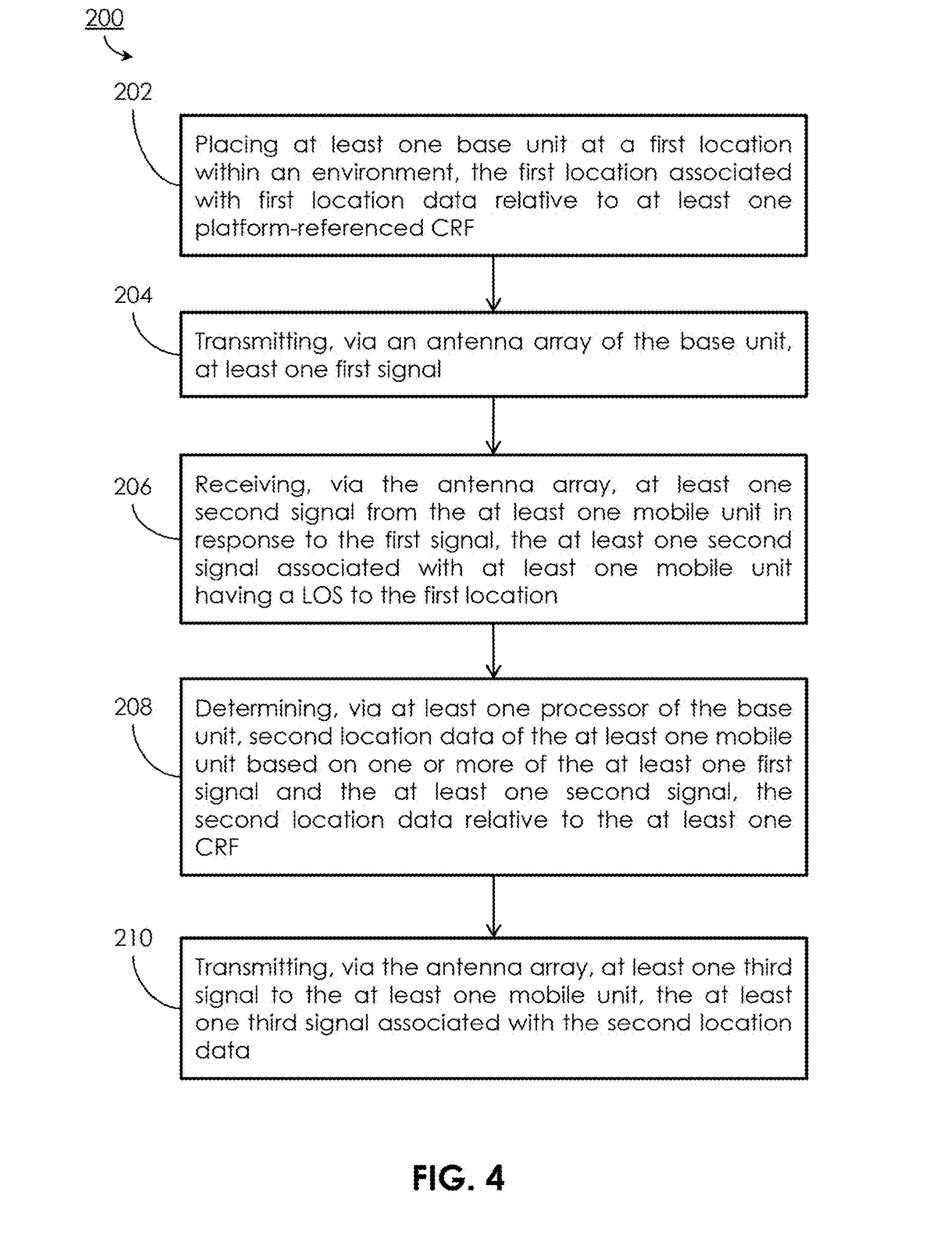
FIG. 4 illustrates an exemplary embodiment of a method for navigation and orientation determination within an environment according to the inventive concepts disclosed herein.

Referring to FIG. 4, an exemplary embodiment of a method 200 for navigation and orientation determination within an environment may be implemented by a base unit 102 of the system 100 in some embodiments, and may include one or more of the following steps.

At a step 202, a base unit is placed at a fixed location within the environment, the fixed location referenced by a platform-referenced CRF of the base unit. For example, the defined environment may be an indoor location or a multi-level environment, within which the base unit may be mounted to a floor, wall, or other interior surface, or an otherwise GPS-denied environment where satellite-based navigation services are inoperable or jammed.

At a step 204, an antenna array of the base unit transmits an initial signal. The initial signal may include the base-unit-CRF-referenced location data of the base unit position, or may simply be a "ping" signal to establish contact with any mobile units in range.

At a step 206, the base unit transceiver receives, via the antenna array, response signals from any mobile units within line of sight (LOS) of the base unit that received the initial signal.

At a step 208, a base unit processor determines base-unit-CRF-referenced location data of each mobile unit based on the initial signal and response signals. For example, the base unit processor may determine a range to each mobile unit based on two-way timing and ranging (TWTR) of the initial and response signals (e.g., by comparing the transmission, reception, and propagation times of each signal between the base unit and mobile unit). The base unit processor may determine an orientation angle of each mobile unit relative to the base unit by determining an angle of arrival (AoA) of each response signal based on its reception by the antenna array.

At a step 210, the base unit transceiver transmits to each mobile unit a location signal including the base-unit-CRF-referenced location data of that mobile unit. For example, the base unit may transmit the base-unit-CRF-referenced location data of each mobile unit to all mobile units within LOS, so that all mobile users may be apprised of each other's locations. Based on base-unit-CRF-referenced mobile unit location data and the base-unit-CRF-referenced location data of the base unit, other mobile units not within LOS of the base unit may determine location data relative to the base unit CRF.

As will be appreciated from the above, systems and methods according to embodiments of the inventive concepts disclosed herein may provide position and head tracking in enclosed or complex environments where differential GNSS may not operate with optimal precision. Embodiments of the inventive concepts disclosed herein may enable additional applications that take advantage of the very accurate position and orientation tracking provided, such as augmented reality, building or structure mapping, combat situational awareness, simulation and training, and multi-user coordination among a network of mobile dismounted users.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for navigation and orientation determination within an environment, comprising:
   at least one base unit configured for mounting at a fixed position within an environment, the fixed position associated with first location data relative to at least one first platform-referenced coordinate reference frame (CRF) and comprising:
      a first antenna array of one or more first antenna elements;
      at least one first transceiver coupled to the first antenna array and configured to:
         transmit at least one first signal via the first antenna array; and
         receive, via the first antenna array, at least one second signal from a mobile unit within the environment, the at least one mobile unit having a line of sight (LOS) to the base unit; and
      at least one first processor coupled to the first transceiver, the first processor configured to:
         determine, based on one or more of the first signal and the second signal, second location data associated with the at least one mobile unit, the second location data relative to the at least one first platform-referenced CRF;
      the at least one first transceiver configured to transmit at least one third signal to the at least one mobile unit via the first antenna array, the third signal associated with the second location data;
   the at least one mobile unit comprising:
      a second antenna array of one or more second antenna elements;
      at least one second transceiver coupled to the second antenna array and configured to:
         receive one or more of the at least one first signal and the at least one third signal via the second antenna array; and
         transmit the at least one second signal to the base unit via the second antenna array;
      at least one second processor coupled to the second transceiver and configured to:
         receive at least one of the first location data and the second location data from the second transceiver; and
         determine at least one first angle of arrival (AoA) associated with the at least one third signal; and
         determine third location data associated with the at least one mobile unit based on at least one of the second location data and the first AoA;
      at least one inertial measurement unit (IMU) coupled to the second processor, the at least one IMU configured to determine head pose data associated with the at least one mobile unit based on the third location data.

2. The system of claim 1, wherein the at least one first transceiver is configured to transmit the first location data to the at least one mobile unit via one or more of the at least one first signal and the at least one third signal.

3. The system of claim 1, wherein the second location data includes at least one of:
   an orientation angle of the at least one mobile unit relative to the base unit; and
   a range of the at least one mobile unit relative to the base unit.

4. The system of claim 3, wherein the first processor is configured to:
   determine the orientation angle by determining at least one second AoA associated with the second signal; and
   determine the range via two-way timing and ranging of the at least one first signal and the at least one second signal.

5. The system of claim 1, wherein:
   the third location data includes at least one azimuth value based on the first AoA; and
   the head pose data includes a heading of the mobile unit relative to the at least one first platform-referenced CRF.

6. The system of claim 1, wherein:
the at least one first antenna array and the at least one second antenna array include at least one electronically scanned antenna (ESA) array; and
one or more of the at least one first antenna array and the at least one second antenna array includes at least one of a third antenna element associated with a first plane and a fourth antenna element associated with a second plane.

7. The system of claim 1,
wherein the at least one first transceiver is configured to be coupled to at least one network via at least one of a physical link and a wireless link.

8. The system of claim 1, wherein the at least one mobile unit is an intermediate mobile unit and the at least one mobile unit includes at least one remote mobile unit having an LOS to the intermediate mobile unit and no LOS to the base unit, and:
the at least one second transceiver is configured to transmit, via the second antenna array, at least one fourth signal to one or more of the at least one intermediate mobile unit and the at least one remote mobile unit, the at least one fourth signal associated with the second location data.

9. The system of claim 8, wherein the at least one intermediate mobile unit is a first intermediate mobile unit; and:
the second transceiver of the at least one remote mobile unit is configured to receive, via the second antenna array, one or more of the fourth signal and at least one fifth signal transmitted by a second intermediate mobile unit, the fifth signal associated with the second location data of the second intermediate mobile unit; and
the second processor of the at least one remote mobile unit is configured to determine the second location data of the remote mobile unit based on at least the fourth signal and the fifth signal.

10. The system of claim 9, wherein the second processor of the at least one remote mobile unit is configured to determine the second location data by determining at least a third AoA associated with the fourth signal and a fourth AoA associated with the fifth signal.

11. The system of claim 9, wherein:
the second transceiver of the at least one remote mobile unit is configured to transmit, via the second antenna array, at least one sixth signal to one or more of the at least one remote mobile unit and the at least one intermediate mobile unit, the at least one sixth signal associated with the second location data of the at least one remote mobile unit.

12. The system of claim 11, wherein the second transceiver of the at least one intermediate mobile unit is configured to:
receive, via the second antenna array, the at least one sixth signal; and
transmit, via the second antenna array, at least one seventh signal to the base unit, the at least one seventh signal associated with the second location data of the at least one remote mobile unit.

13. The system of claim 1, wherein:
the first location data includes a georeferenced location; and
the at least one first platform-referenced CRF includes a geocoordinated CRF.

14. The system of claim 1, wherein:
the environment is associated with a structure corresponding to at least one structure model; and
the at least one first platform-referenced CRF includes at least one structure-referenced CRF corresponding to the structure model.

15. The system of claim 1,
wherein the environment includes at least one of an indoor environment, a GPS-denied environment, and a multi-level environment.

16. A method for navigation and orientation determination within an environment, the method comprising:
placing at least one base unit at a first location within an environment, the first location associated with first location data relative to at least one platform-referenced coordinate reference frame (CRF);
transmitting, via an antenna array of the base unit, at least one first signal;
receiving, via the antenna array, at least one second signal from at least one mobile unit in response to the first signal, the at least one mobile unit having a line of sight (LOS) to the first location;
determining, via at least one processor of the base unit, second location data of the at least one mobile unit based on one or more of the at least one first signal and the at least one second signal, the second location data relative to the at least one CRF and including at least one of 1) a range of the at least one mobile unit relative to the base unit based on two-way timing and ranging of the at least one first signal and the at least one second signal and 2) an orientation angle of the at least one mobile unit relative to the base unit by determining an angle of arrival (AoA) associated with the at least one second signal; and
transmitting, via the antenna array, at least one third signal to the at least one mobile unit, the at least one third signal associated with the second location data.

17. The method of claim 16, wherein placing at least one base unit at a first location within an environment, the first location associated with first location data relative to at least one platform-referenced coordinate reference frame (CRF) includes:
placing at least one base unit at a first location within one or more of an indoor environment, a GPS-denied environment, and a multi-level environment, the first location associated with first location data relative to at least one platform-referenced CRF.

18. The method of claim 16,
wherein transmitting, via an antenna array of the base unit, at least one first signal includes:
transmitting, via an antenna array of the base unit, at least one first signal associated with the first location data.

* * * * *